United States Patent

[11] 3,602,891

[72] Inventors Wesley A. Clark;
Charles E. Molnar, both of St. Louis, Mo.
[21] Appl. No. 805,548
[22] Filed Mar. 10, 1969
[45] Patented Aug. 31, 1971
[73] Assignee Washington University
St. Louis, Mo.

[54] CONTINUOUS TRANSMISSION COMPUTER AND MULTIPLE RECEIVER SYSTEM
13 Claims, 2 Drawing Figs.

[52] U.S. Cl. .......... 340/172.5
[51] Int. Cl. .......... H04n 7/08
[50] Field of Search .......... 178/69.5, 4.1; 325/55, 58, 54; 340/172.5; 235/151

[56] References Cited
UNITED STATES PATENTS

| | | | |
|---|---|---|---|
| 3,230,509 | 1/1966 | Spencer | 340/172.5 X |
| Re. 26,171 | 3/1967 | Falkoff | 340/172.5 |
| 3,387,268 | 6/1968 | Epstein | 340/172.5 X |
| 3,496,549 | 2/1970 | Tong | 340/172.5 |

*Primary Examiner*—Raulfe B. Zache
*Attorney*—Kingsland, Rogers, Ezell, Eilers & Robbins ABSTRACT: Continuous broadcast of computer programs and instructions for selector utilization by remote data processors. An information transmission and multiple receiver system wherein the transmitter continuously repeats transmissions of data primarily consisting of instructions such as programs, routines and subroutines from its relatively large central memory. Each receiver can be directed to any selected portion of the continuous stream of transmitted data for storage of the selected data in a relatively small memory for ultimate use by any suitable processor. Transmitted data is automatically coded in plural bit words and groups of words are automatically coded in word blocks. The receiver automatically detects receipt of a selected word block and automatically processes the words within the selected word block into its memory in a directed program. As a result of this system and process, individual, low-power data processors at each receiver are empowered with a much greater processing capability from the program data broadcast from the transmitter's large central memory and selectively stored in the receiver's smaller memory.

PATENTED AUG 31 1971 3,602,891

SHEET 1 OF 2

INVENTORS:
WESLEY A. CLARK,
CHARLES E. MOLNAR,
BY Kingsland, Rogers, Ezell, Eilers & Robbins
ATTORNEYS INVENTORS:
WESLEY A. CLARK
CHARLES E. MOLNAR
BY Kingsland, Rogers, Ezell, Eilers + Robbins
ATTORNEYS

CONTINUOUS TRANSMISSION COMPUTER AND MULTIPLE RECEIVER SYSTEM

BRIEF DESCRIPTION OF THE INVENTION

This invention provides a computing or data processing system having a relatively large but simple central storage and transmission system which transmits fixed programs or data to a large number of receivers. The transmitter can continuously broadcast all of the information in its library over one or a plurality of transmission bands. Information, utilizing the transmitted computer programs processing is carried out by the receivers, which selectively extract information from the continuous broadcast stream as needed. Any number of independent receivers can select different portions of the broadcast stream or can simultaneously make use of the same parts (or all) of the broadcast information. The continuously available broadcast information comprising computer programs to be selected by the receivers thus permits large numbers of very small receivers with limited local working storage to do very large and complex jobs at low cost.

Many different applications can be effectively dealt with by means of the system of this invention. A system of desk calculators for example, would require almost no local storage and yet would be able to execute a large and easily augmented set of complex arithmetic functions and table look-up procedures. Another use would be to provide a large and rapidly accessed library of programs and data to a number of small locally programmable computers. Hospital intensive care monitoring could be accomplished by a large number of independent but identical receivers acting as bedside stations, each selecting from the broadcast library those programs needed to carry out its assigned monitoring tasks. Each of these stations could, in turn, be a part of a data gathering or supervisory network unrelated to the broad casting system. The broadcasting system would serve to logically impower the individual receivers.

Two important design parameters of the broadcasting system are the total size of the library (the totality of information available to a given receiver) and the time needed to gain access to information within it. The desirable system minimizes the local working storage and complexity of the receivers for a given system through the proper choice of number of transmitters, storage medium, number and characteristics of transmission channels, message coding, and broadcast schedules. A broadcasting system according to the invention would, for example, be capable of transmitting 1 million bits 30 times per second over coaxial cables. Such a broadcasting system, with simple receivers having local working storage of the order of $10^3$ to $10^4$ bits (perhaps augmented with modest local backup storage) for example, would be adequate to handle several applications. This invention may extend to relatively complicated systems containing a multiplicity of transmitters serving overlapping populations of receivers, but the example described herein relates in general to a simple system with a single transmitter serving a single family of receivers.

The transmitter must store and repeatedly transmit a fixed library of information reliably and economically. In its simplest form, the transmitter spews out a single stream of serial binary information, repeating the stream cyclically and continuously. For some purposes, it may be desirable to have a more rapid access to some parts of the transmitted library than to others. This may be accomplished by repeating certain information several times in one transmission of the complete library, or by transmitting several different parts of the library simultaneously, each with a different cycle time, over more than one parallel transmission channel.

The principle component of the transmitter is the storage device used to hold the library. Depending upon the application, the storage device or memory may be embedded in a more or less complex system for loading the library, making modifications to its contents, and controlling the readout of the stored information. At least three or four different types of storage units may be used, including the delay line, the rotating memory (disc, or drum), various photographic techniques, and the random access magnetic core or film memory.

Typical acoustic delay lines can store and deliver several thousand bits at rates of 1 to 20 million bits per second. A 5,000 bit line which operates at 1 megabit per second is a representative example of an acoustic delay line that is commercially available. The difficulties of loading information into a delay line, the relative small storage capacity, and the fixed delay time make the acoustic delay line appear to be attractive primarily for small and highly specialized systems in which the low cost can be exploited.

For large libraries, rotating memories such as discs, drums or photographic memories may be used. A typical disc of moderate size is capable of storing 100,000 bits on each of 64 tracks and can deliver information at a rate of 3 million bits per second per track. Depending upon the number of heads employed for reading, the disc can deliver information at rates from 3 million to 192 million bits per second. The rotation rate is typically 1/30 or 1/60 of a second, but smaller access times can be obtained by placing heads at several positions along the circumference of a track, The relatively low cost (a fraction of a cent per bit for 5×bits) and the cyclic delivery of information at a constant bit rate make the disc a useful storage unit if the size of the library is sufficiently large and the fixed time per rotation is tolerable.

Random access magnetic memories have advantages in flexibility of timing and allow easy loading and modification of the stored library. Bit rates from zero up to 30 million or more per second can be obtained with a single memory array, and paralleling of more than one memory array for even higher rates is easily done. Complex broadcasting schedules in which certain segments of the library are repeated more than once in a complete broadcasting schedule can be accomplished easily without requiring storing of the repeated sections at more than one place in the memory. For small to moderate libraries, ranging up to $10^5$ or $10^6$ bits, a transmitter using random access magnetic storage may be used.

Photographic memories may be appropriate for stable libraries of very large size.

The transmission system must accept the output of the transmitter and distribute it to each receiver. The principal system design parameters are the number of transmission channels, the information transmission rate of each channel, and the treatment of transmission errors. Media for transmission channels range from telephone lines, capable of transmission rates of a few thousand bits per second, through coaxial cables of intermediate capacity, and up to microwave links capable of transmitting many millions of bits per second. It is possible to use this invention as a kind of "information distributing utility" with an enormous library on many channels, selectively available to different classes of receiver "subscribers" over a comprehensive transmission system employing various types of channels for different parts of the service.

In addition to the choice of transmission medium, a choice must be made of the form of encoding that is to be used. The simplest case may employ a single coaxial cable carrying a self-clocking pulse-width-modulated signal transmitted directly without any carrier. For more complex systems, particularly those using electromagnetic radiation as the medium or those multiplexing several channels on a single cable, more complex modulation schemes would be appropriate.

The receiver may conveniently be thought of as made up of two major functional parts. The receiver front end consists of the necessary apparatus to select broadcast channels, demodulate and decode the information carried thereon, detect the arrival of a desired portion of the library, and deliver it to the processor. It may be convenient to consider any information buffering used in the reception of the message as part either of the front end or of the processor, depending upon what other use is made of the buffer by the processor. A typical front end will accept the code designation of a desired portion of the library and carry out the channel switching and all other operations needed to obtain the requested information. The processor part of the receiver may be any conventional processor specialized to the application. As such the processor has the usual input-output capability to receive data, process the data with the instructional programs received from the transmitter, with or without any additional programming of the processor, and produce the results at its output.

In the illustrated embodiment of this invention, a reasonably general and flexible broadcasting system is set forth. For the transmitter, particularly illustrative in this specification, a core memory of 32,768, 12-bit words with a cycle time of about 2 microseconds is described. This provides a flexible, accessible and efficient transmitter capable of delivering about 1.5 megabits per second on a single channel. For a transmission system, a modified community antenna television system (CATV) would transmit video (4 mHz.) bandwidths on up to 12 channels, lying in the VHF television bands, via a coaxial cable distribution network. The color television receiver front-end includes a tuner, *i-f* strip and second detector, providing a 4-mHz. signal for further demodulation. Such a system can be used to provide, for example, a desk calculator with little or no local storage, a patient monitoring subsystem for operations such as waveform analysis of EKG records, and program and data library support for small computers.

Thus, this invention provides and effectively simultaneous one-way transmission of information to many small and potentially very simple computers or other kinds of processors. The dispatching and priority problems usually associated with the sharing of a central storage element by a large number of peripheral terminals are eliminated, and the number of receivers can be indefinitely increased in a given system without any alteration to the transmitter.

DETAILED DESCRIPTION OF THE INVENTION

Figure 1:
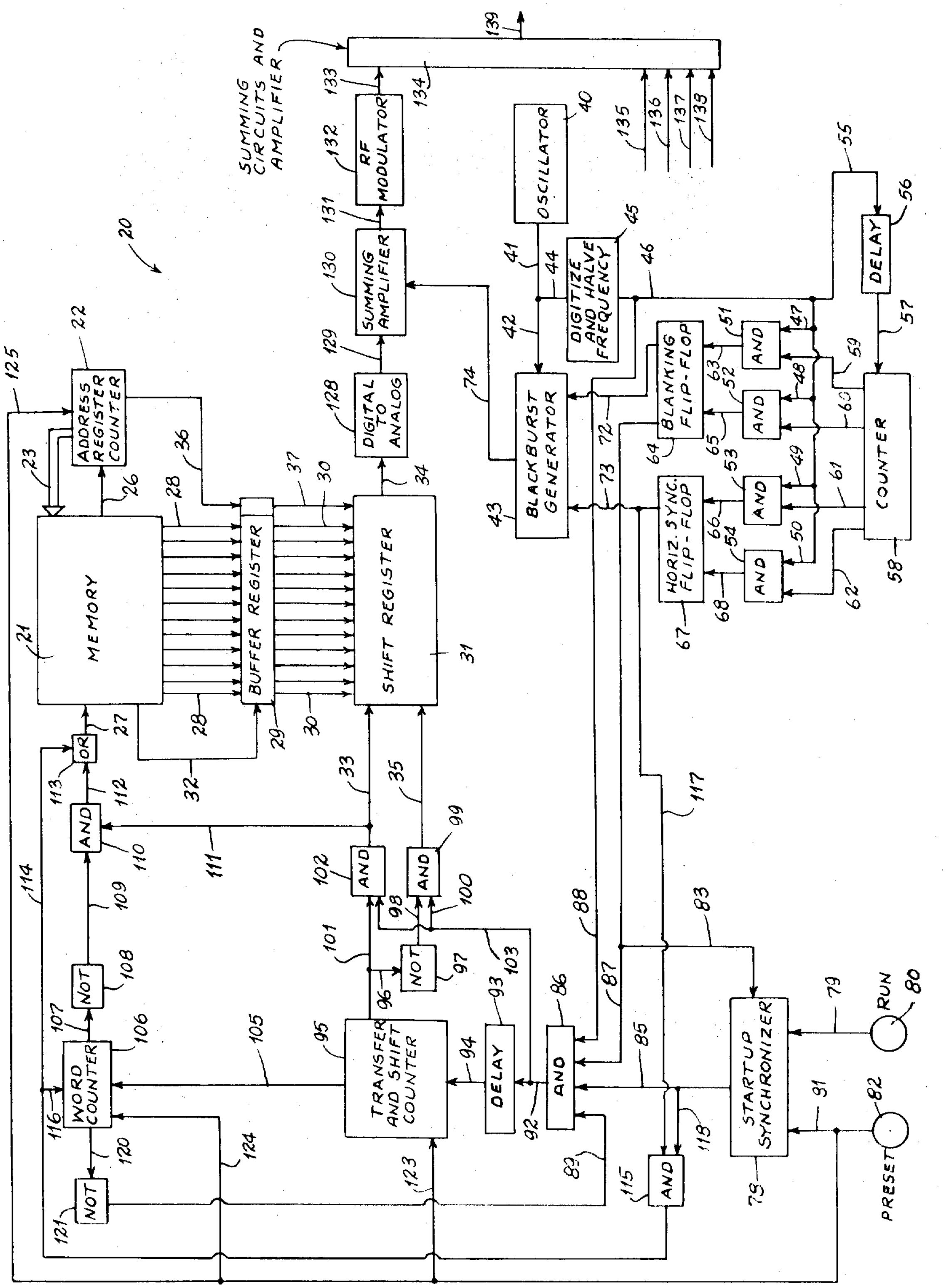
FIG. 1 is a schematic block diagram of the central storage and transmission system.

The central storage and transmission system 20 has a conventional digital memory storage device 21 which, for example, may store 32,768 words, each containing 12 bits. The memory storage device 21 is addressed by an address register counter 22 that, in the present example, provides for sequential scanning through the entire memory cycle and, as will be described, causes the scanning to be continually repeated. Selective or random scanning could be programmed if desired by devices known to the art.

An address input conductor bank 23 leads from the address register counter 22 to the memory storage device 21 to deliver address signals to the storage device 21. There is also a conductor 26 leading from the memory storage device 21 to the address register counter 22 that carries an indexing signal at the end of each cycle of locating a word by the memory storage device 21. The address register counter 22 is of a kind that, when triggered by the indexing signals supplied through the conductor 26, causes the address next in numerical sequence to be delivered to the memory storage device 21. Another input conductor 27 to the memory storage device 21 delivers a signal, derived as will be described, to instruct the memory storage device to locate the word to which the memory storage device has been directed by the address register counter 22.

The memory storage device 21 has 12 output conductors 28 for transferring the 12 bits of a word in parallel to a buffer register 29. The buffer register 29 has 12 output conductors 30 for transferring the 12 bits of a word from the buffer register 29 to a shift register 31. A conductor 32 delivers a signal from the memory storage device 21 to the buffer register 29 to initiate transfer of the word from the memory storage device 21 to the buffer register 29, when the memory storage device 21 has located the word to which it was addressed. A conductor 33 supplies a signal, derived as will be described, to the shift register 31 to initiate transfer of a word from the buffer register 29 to the shift register 31. An output conductor 34 leads from the shift register 31. Another conductor 35 supplies selected high-frequency clock pulses to the shift register 31 to cause serial shifting of the bits of a word as serial digital data from the shift register 31 to its output conductor 34.

In addition, a conductor 36 delivers a 1 signal to the buffer register on certain counts of the address register counter 22, to be described. A conductor 37 transmits this special 1 signal to the shift register 23.

It has been said that the shift register 31 is triggered by clock pulses, and it will become apparent that these clock pulses are delivered to other parts of the system. To produce these clock pulses, there is a crystal oscillator 40 that generates a sinusoidal signal at a frequency of 3.57954 mHz. in its output conductor 41. The output from the crystal oscillator 40 is supplied by an input conductor 42 to a black burst generator 43 and also, by an input conductor 44, to a device 45 digitizing and halving the frequency of its sinusoidal wave input to produce a square wave output signal phase locked to the oscillator frequency. This square wave output signal is referred to herein as a clock pulse signal.

The clock pulse signal is transmitted by a conductor 46 to the input conductors 47, 48, 49 and 50 of a plurality of AND gates 51, 52, 53 and 54, respectively, and also by a conductor 55 to a delay device 56. The delay device 56 delivers the delayed clock pulse through a conductor 57 to a counter 58 that is designed to count the input clock pulses beginning with a count of 0 through and ending with a count of 113 with the 114th pulse causing a return to a count of 0, thereby continuously repeating the count cycle of 0 through 113 for establishing the basic cycle of the system. The counter 58 has an output conductor 59 that transmits a signal to the AND gate 51 on a 94 count in the counter 58. Another conductor 60 transmits a signal to the AND gate 52 upon a count of 0 in the counter 58. A conductor 61 transmits a signal to the AND gate 53 on a count of 97 in the counter 58. Another conductor 62 transmits a signal to the AND gate 54 on a count of 105 in the counter 58.

The AND gate 51 has an output conductor 63 leading to the "set" input of a blanking flip-flop 64. The AND gate 52 has an output conductor 65 leading to the "reset" or "clear" input of the blanking flip-flop 64. The AND gate 53 has an output conductor 66 leading to the "set" input of a horizontal sync flip-flop 67. The AND gate 54 has an output conductor 68 leading to the "reset" or "clear" input to the horizontal sync flip-flop 69.

A conductor 72 delivers a signal from the "set" output of the blanking flip-flop 64 when the blanking flip-flop is in its "-set" condition. A conductor 73 delivers a signal from the "-set" output of the horizontal sync flip-flop to the black burst generator 43 when the horizontal sync flip-flop is in its "set" condition. With these blanking and horizontal sync signals and with the sinusoidal wave supplied from the input conductor 42, the black burst generator 43 can and does generate a typical black burst signal, like a color television signal without picture or color information, which it delivers to an output conductor 74 for a purpose to be described. The black burst signal has the duration of the blanking pulse to which the horizontal sync signal and then the high-frequency sinusoidal wave signal are added.

A startup synchronizer 78 has an input conductor 79 leading from a "start" or "run" pushbutton 80. Another input conductor 81 to the startup synchronizer leads from a "preset" pushbutton 82 which produces an initial clearing signal. Another input to the startup synchronizer 78 comes from a conductor 83 connected to the "reset" or "clear" output of the blanking flip-flop 64. The startup synchronizer 78 has a conventional arrangement of flip-flops and gates to synchronize the "run" signal with the horizontal blanking signal to assure that the output from the startup synchronizer does not occur during blanking. The output from the startup synchronizer is delivered by a conductor 85 to an "AND" gate 86. Another input conductor 87 to the AND gate 86 leads from the "reset" or "clear" output of the blanking flip-flop 64 to deliver a "nonblanking" signal to the and gate 86 when the blanking flip-flop is in its "reset" condition.

The clock pulse signal from the digitize and halve frequency device 45 is delivered by an input conductor 88 to the AND gate 86. One other input conductor 89 to the AND gate 86 delivers a signal to be described that normally permits the AND gate 86 to pass the clock pulse signal delivered by the conductor 88.

A conductor 92 connects the output from the AND gate 86 to deliver clock pulses to a delay device 93, the clock pulse output of which is transmitted by a conductor 94 to a transfer and shift counter 95. The transfer and shift counter 95 counts the clock pulses supplied to it in repeated cycles of 0 through 13 with the 14th pulse causing a return to count 0. It has an output conductor 96 for delivering a signal signifying that the counter is registering a 0 count to an inverting device 97 which in turn transmits a signal only when the transfer and shift counter 95 is not registering a 0 count. A conductor 98 leads from the inverting device 97 to an AND gate 99. Another input to the AND gate 99 is supplied by a conductor 100 that carries clock pulses from the AND gate 86. The output from the AND gate 99 is connected to the input conductor 35 leading to the shift register 31.

The 0 count signals from the transfer and shift counter 95 are supplied by another conductor 201 to an AND gate 102. Another input conductor 103 to the AND gate 102 leads from the conductor 92 carrying the clock pulses from the AND gate 86. The output from the AND gate 102 is connected to the input conductor 33 to the shift register 31.

Another conductor 105 from the transfer and shift counter 95 delivers a pulse to a word counter 106 only when the transfer and shift counter 95 makes the transition from count 13 to count 0 or, in other words, on the 14th pulse, during each 0–13 count cycle. The word counter 106 is designed to continuously repeat the cycle of counting words from 0 to 6, with the seventh pulse causing a return to count 0. The word counter 106 has an output conductor 107 that, upon counting each fifth word, delivers a signal to an inverting device 108. Hence, the inverting device 108 supplies a signal on all word counts except for the duration lasting from the end of the fifth word count to the end of the sixth word count, and for the latter duration the inverting device 108 supplies no signal. The output from the inverting device 108 is transmitted by a conductor 109 to an AND gate 110. Another input conductor 111 to the AND gate 110 is connected to the output from the AND gate 102.

The output from the AND gate 110 is transmitted by a conductor 112 to an OR gate 113. The output from the OR gate 113 is connected to the conductor 27 leading to the memory storage device 21. Another input conductor to the OR gate 113 delivers horizontal sync pulses from an AND gate 115. These horizontal sync pulses from the AND gate 115 are also transmitted by a conductor 116 to the word counter 106 to reset the word counter 106 to 0. One input to the AND gate 115 constitutes the horizontal sync pulse supplied by a conductor 117 connected to the "set" output of the horizontal sync flip-flop 67. The other input to the AND gate 115 is delivered by a conductor 118 connected to the output from the startup synchronizer 78.

A conductor 120 leading from the word counter 106 delivers a signal to an inverting device 121 only following a sixth word count by the word counter 106 and until the transmission of a horizontal sync pulse to the word counter during each word count cycle. Hence, the inverting device transmits a signal at all times except for the duration lasting from the end of a sixth count to the beginning of the following horizontal sync pulse. The output from the inverting device 121 is transmitted by the conductor 89 to the AND gate 86.

The "preset" signal, generated upon depression of the "-preset" pushbutton is delivered by a conductor 123 to the transfer and shift counter 95. This "preset" signal is also delivered to the word counter 106 by a conductor 124 and to the address register counter 22 by a conductor 125.

The output conductor 34 from the shift register 31 transmits the serial digital signal from the shift register to a digital to analog converter 128. A conductor 129 transmits the analog signal from the digital to analog converter 128 to a summing amplifier 130. The other input to the summing amplifier is the black burst signal delivered by the conductor 74 from the black burst generator 43. The summing amplifier 130 produces a video signal containing the black burst signal and the analog signal corresponding to the word shifted out of the shift register 31. This video signal is transmitted by a conductor 131 to an RF modulator 132, and the modulated signal is transmitted by a conductor 133 to a summing circuit and amplifier network 134 to which other signals generated by systems corresponding to this central storage transmission system 20 are also delivered, as by conductors 135, 136, 137 and 138. An output connection 139 enables connection of the summing circuit and amplifier network 134 to a television transmission cable array (not shown).

Figure 2:
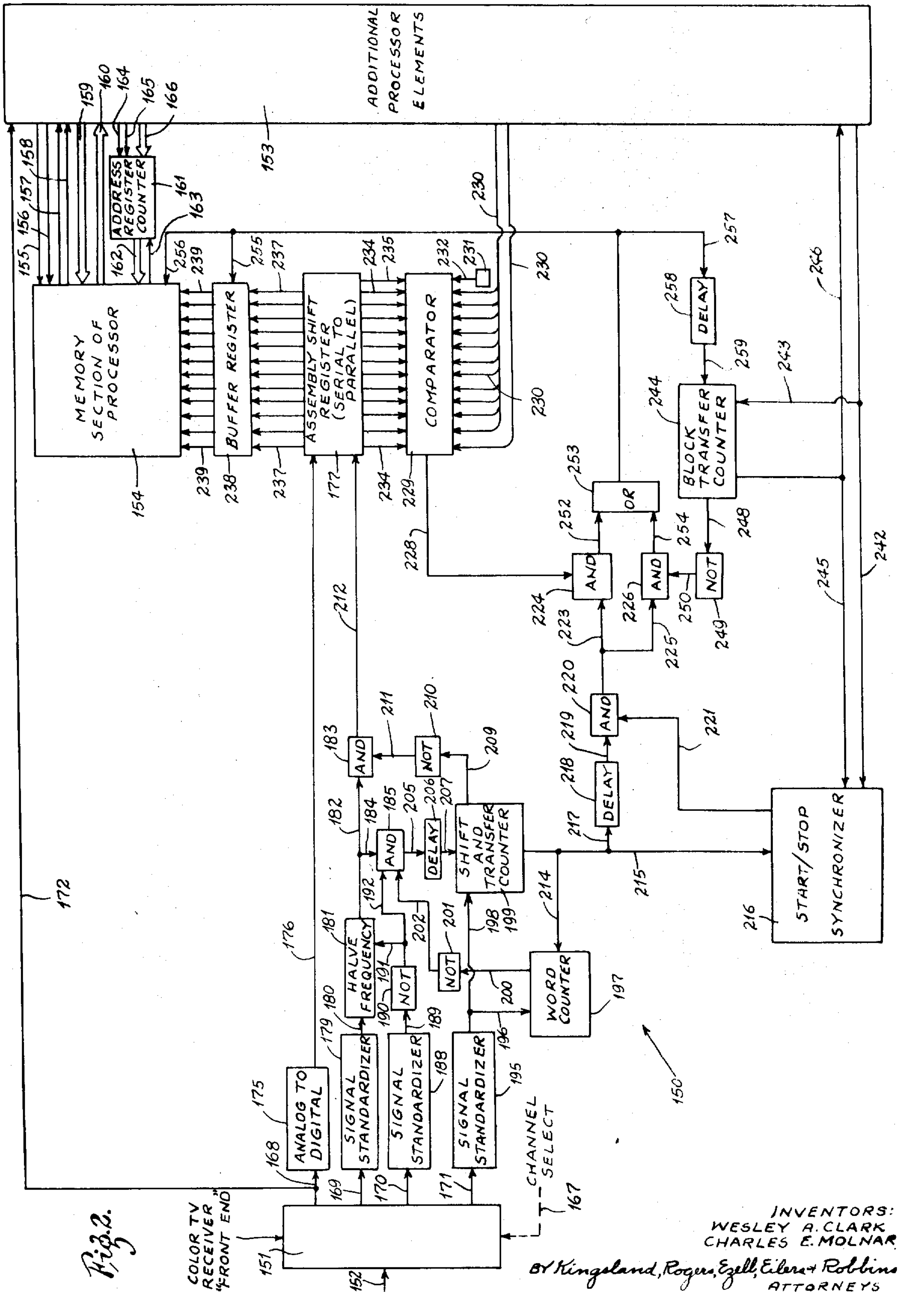
FIG. 2 is a schematic block diagram of the receiver.

FIG. 2 is a schematic diagram of a receiver 150. The receiver 150 has a conventional color television receiver "-front end" 151 that has an input connection 152 to which the cable network carrying the signals transmitted by the central storage and transmission system 20 is connected. As will be described, the receiver 150 operates upon this signal received by the color TV receiver 151 to ultimately supply information to a processor 153 that may comprise any conventional processor desired for processing input data with computer programs supplied by this broadcast system and, as desired also input directly to the processor 153 The additional processor 153 contains an internal memory section 154 that may be much smaller than the memory section 21.

The additional processor is joined to its memory section 154 by a suitable plurality of conductors 155, 156, 157, 158, 159, and 160. These conductors 155–160 provide memory access pathways used in conventional operation of the processor 153. An address register counter 161 has an output conductor bank 162 that transmits address signal to the memory section 154. In this example of the invention, the address register counter 161 directs the memory section 154 sequentially through its storage of 12-bit words. Another conductor 163 is connected from the memory section 154 to the address register counter 161 to deliver an end-of-cycle pulse at such time as the memory section 154 has received and stored a 12-bit word at the proper position in its memory as dictated by the address signal in the conductor bank 162. There are suitable conductors 164, 165 and 166 illustrative of the means by which the processor 153 communicates with the address register counter 161 in the utilization of information contained in the memory section 154. The address register counter 161 has a suitable conventional means (not shown) for disabling the transmission of end-of-cycle pulses through the conductor 163 when signals are being transmitted through the conductors 155–160 or through the conductors 164–166.

The color TV receiver "front end" 151 has a conventional receiver means 167 for selecting any one of the several channels to select any one of several information streams being transmitted by a plurality of central storage transmission systems like the system 20 previously described. The color TV receiver 151 separates the received signal into video, phase-locked color subcarrier, blanking and horizontal sync component signals. The video signal is supplied to an output conductor 168. The phase-locked color subcarrier signal is supplied to an output conductor 169. The blanking signal is supplied to an output conductor 170. The horizontal sync signal is supplied to an output conductor 171. The video signal is also transmitted as an analog signal directly to the additional processor elements 153 by a conductor 172.

The video signal from the color TV receiver front end 151 is transmitted through the conductor 168 to an analog to digital converter 175. An output conductor 176 from the analog to digital converter 175 carries the digital bit data corresponding to the word bits shifted out of the shift register 31 of the central storage transmission system 20. This digital bit data is continually transmitted in series through the conductor 176 to an assembly shift register 177 into which the data is shifted and held as parallel information upon receipt of certain shift pulses by the assembly shift register 177 as will be described.

The phase locked color subcarrier signal is delivered by the conductor 169 to a signal standardizer 179 that digitizes its input to a square wave. The square wave output from the signal standardizer 179 is transmitted by a conductor 180 to a frequency-halving device 181 that halves the frequency of its input. The input from the frequency-halving device 181 constitutes a clock pulse signal identical to the clock pulse signal produced in the central storage transmission system 20 and phase-locked to the blanking signal as will be described. This clock pulse signal is transmitted from the frequency-halving device 181 through a conductor 182 to an AND gate 183 and though a conductor 184 to an and gate 185.

The blanking signal from the color TV receiver front end 151 is transmitted through the conductor 170 to a signal standardizer 188. The output from the signal standardizer 188 is transmitted by a conductor 189 to an inverting device 190 that delivers no signal when there is a signal in the input conductor 189 and that does deliver a signal when there is no signal in the input conductor 189. The output from the inverting device 190 is delivered by a conductor 191 to the frequency-halving device 181 to phase-lock the clock pulse signal with the blanking signal. The output from the inverting device 190 is also transmitted by another conductor 192 as an input to the AND gate 185.

The horizontal sync pulse from the color television receiver front end 151 is transmitted through the conductor 171 to a signal standardizer 195. The output from the signal standardizer 195 is transmitted by a conductor 196 to a word counter 197 to set the word counter to a word count of 0. The word counter 197 is designed to continuously repeat the cycle of counting words from 0 through 6. Another conductor 198 transmits the output from the signal standardizer 195 to a shift and transfer counter 199 to set the shift and transfer counter to 0. The shift and transfer counter is designed to continuously repeat the cycle of counting pulses from 0 through 13.

The word counter 197 has an output conductor 200 that is connected to transmit a signal from the word counter 197 onlY upon a count of 6. This conductor 200 leads to an inverting device 210 that delivers a signal when there is no signal in the input conductor 200 (when the word counter is not registering a count of 6), and to deliver no signal when there is a signal in the input conductor 200 (when the word counter is registering a count of 6). The output from the inverting device 210 is delivered by a conductor 202 to the AND gate 158.

The output from the AND gate 185 is transmitted by a conductor 205 to a delay device 206 the output from which is delivered by a conductor 207 to the shift and transfer counter 199. An output conductor 209 leads from the shift and transfer counter 199 to carry a signal when the shift and transfer counter registers a count of 13. The conductor 209 leads to an inverting device 210 the output from which is connected by a conductor 211 to the AND gate 183. The inverting device delivers a signal to the AND gate 183 on all counts from 0 to 12 but delivers no signal when the shift and transfer counter is registering a count of 13. The AND gate has an output conductor 212 for delivering clock pulses to the assembly shift register 177.

Another signal from the shift and transfer counter 199 is established following a count of 13 until the end of the next succeeding 0 count. This signal is transmitted by a conductor 214 as an indexing signal to the word counter 197. This same signal, constituting a word-assembled pulse, is also transmitted by a conductor 215 to a start/stop synchronizer 216. Finally, this same signal from the shift and transfer counter 199 is transmitted by another conductor 217 to a delay device 218, the output from which is transmitted by a conductor 219 to an AND gate 220. Another conductor 221 connected to the input of the AND gate 220 leads from the start/stop synchronizer 216 and delivers a signal to the AND gate 220 when the start/stop synchronizer 216 is in the "set" or "on" condition, which occurs in a manner to be described. The output from the AND gate 220 is delivered by a conductor 223 to one AND gate 224 and by another conductor 225 to another AND gate 226.

Another input to the AND gate 224 constitutes a "match" signal delivered by a conductor 228 leading from a comparator 229. The comparator 229 is programmed from the processor 153 through a plurality of conductors 230 with a "tag number" corresponding to identifying number of the word block to be selected for transmission to the memory section 154. There is also a device 231 that continuously transmits a 1 signal through a conductor 232 to the comparator 229.

There are 12 conductors 234 leading from the assembly shift register 177 to the comparator 229 to enable comparison of the 12 bits of a word resting in the assembly shift register with the twelve bits of the "tag number" supplied to the comparator 229 through the conductors 230. There is also a conductor 235 that transmits a 1 signal from the assembly shift register 177 to the comparator whenever the word in the assembly shift register is a block identifying word.

There are 12 conductors 237 for delivering the 12-bits of a word in the ta block to a buffer register 238. Twelve other conductors 239 deliver the 12-bit word in parallel to the memory section of the processor 154 when the buffer register 238 is directed to do so as will be described.

A conductor 242 leading from the processor 153 delivers a start selection/transfer process signal to the start/stop synchronizer 216 when the processor 153 seeks certain information from the total stream of information transmitted by the transmission system 20. This start selection/transfer process signal is also delivered by another conductor 243 to a block transfer counter 244. The block transfer counter 244 is designed to continuously repeat cycles of counting pulses from 0 to 255. When a signal is transmitted through the conductor 243, that signal sets the block transfer counter 244 to a count of o.

Upon completion of a count of 255 and a subsequent count of 0, the block transfer counter 244 transmits an output signal through a conductor 245 to the start/stop synchronizer 216 to stop operation thereof. This same signal is transmitted by a conductor 246 to the processor 153 to communicate to the processor the fact that an entire block of 256 works has been counted by the block transfer counter 244.

The block transfer counter 244 has an output conductor 248 that delivers a signal to an inverting device 249 only when the block transfer counter registers 0. An output conductor 250 from the inverting device 249 carrier no signal when there is a signal in the input conductor 248 corresponding to a count of 0 and transmits a signal during all other counts of 1 through 255 by OR block transfer counter 244 since, during the 1 through 255 counts, there is no signal in the conductor 248. The conductor 250 constitutes another input to the , gate 266.

The output from the AND gate 224 is transmitted by a conductor 252 to an OR gate 253. The output from the AND gate 226 is also delivered by another conductor 254 to the OR gate 253. The output from the OR gate 253 is delivered by a conductor 255 to a transfer input to the buffer register and by a conductor 256 to a transfer input to the memory section 154. The output from the OR gate 253 is also delivered by a conductor 257 to a delay device 258. The output from the delay device 258 delivers indexing pulses through a conductor 259 to the block transfer counter 244.

OPERATION

It will be understood that this invention contemplates the connection of a large number of receivers 150 to the cable network array. With one or more transmission systems 20, depending upon the volume of information it is desired to store, continuously transmitting the stored data in repeating cycles, the receivers can independently select what portion of any transmission cycle is to be received. Accordingly, since at any one time each receiver will receive and process only a relatively small portion of the total library of information stored by the transmitter or transmitters, each receiver is a relatively simple device with a relatively small memory capacity. When changes are made in the information stored in the library, such changes are made only at the transmitter or transmitters rather than at the large number of local receiver stations. Furthermore, the computer power of each receiver can be low because of the selective availability of computer programs that are being continuously broadcast by the transmission system 20.

Various components of the transmission system 20 are set for initiating operation by depressing the preset pushbutton 82. The preset signal supplied by the conductor 123 to the transfer and shift counter 95 clears that counter to a count of 0. The present signal supplied by the conductor 124 to the word counter 106 sets the word counter to a count of 6. The preset signal supplied by the conductor 125 to the address register counter 22 clears the address register counter to a count of 0. The preset signal supplied by the conductor 81 clears the synchronizer 78 in preparation for receipt of the run signal. The transmission system 20 is started by depressing the run pushbutton 80.

Clock pulses phase-locked with the sinusoidal signal generated by the crystal oscillator 40 are transmitted to the AND gate 86. These clock pulses are passed through the AND gate 86 so long as there is a nonblanking signal in the conductor 87 from the "reset" output of the blanking flip-flop 64, a signal in the conductor 85 from the startup synchronizer 78 signifying the system has been set to run, and a signal in the conductor 89 indicating the word counter 106 is not in the counting state between the end of the sixth word and the beginning of the horizontal sync pulse. The transfer and shift counter 95 counts the input clock pulses passed by the AND gate 86 to initiate several functions: unloading of a word from the memory storage device 21 into the buffer register 29, dumping of a word from the buffer register 29 to the shift register 31, shifting out of bits from the shift register 31 to its output conductor 34, and counting of works in the word counter 106.

A horizontal sync signal is supplied by the conductor 114 to the OR gate 113 and is passed by the OR gate 113 to the unload input conductor 27 leading to the memory storage device 21. This signal causes the memory storage device 21 to read the 12-bit word to which it has been programmed or addressed for unloading to the buffer register 29. As soon as the 12-bit word has been read by the memory storage device 21, a data available signal is transmitted from the memory storage device through the data available conductor 32 to the buffer register 29, causing the 12-bit word to be transferred (copied) through the conductors 28 into the buffer register 29 along with a special signal through the conductor 36 from the address register counter 22 as later described. Since the horizontal sync pulse occurs only once during each scanning line (established by the period of the counter 58), it causes unloading of only the first of the six words that are read out in each scanning line.

As soon as the memory storage device has completed the cycle of reading and dumping a work into the buffer register 29, it produces a signal in the end of cycle conductor 26 that is transmitted as an indexing signal to the address register counter 22. This causes the address register counter 22 to transmit the next address through the conductors 23 to prepare the memory storage device 21 to read the next word it is storing. 13.

A signal representing a 0 count is supplied by the transfer and shift counter 95 and delivered to the conductors 96 and 101. This 0 count signal is inverted in the inverting device 97 so that the AND gate 99 passes the clock pulse signal delivered to it through the conductor 100 only when the transfer and shift counter does not register 0 or, in other words, during the counts from 1 through 13. These clock pulses are passed by the AND gate 99 to the shift input conductor 35 to cause any 13-bit word then held in the shift register 31 to be transferred in series to the shift register output conductor 34.

The clock pulse signal passed by the AND gate 86 is supplied to the conductor 103 leading to the AND gate 102. So long as there is a o count in the transfer and shift counter 95, the AND gate 102 passes a clock pulse to the AND gate 110. Unless there is no signal in the conductor 109, constituting an inhibiting condition that appears from the end of counting the fifth word to the end of counting the sixth word in the word counter 106, the AND gate 110 passes the clock pulse signal to its output conductor 112 and delivers that clock pulse signal to the OR gate 113. This clock pulse signal is passed by the OR gate 113 to the unload input conductor 27 directing the memory storage device 21 to unload the word to which it has been addressed by signals in the conductor bank 23 from the address register counter 22. Shortly thereafter, the memory storage device 21 delivers a signal in the data available output conductor 32 that leads to the buffer register 29. This data available signal triggers the buffer register 29 to cause the 12-bit word to be unloaded from the memory storage device 21 through the conductors 28 to the buffer register 29 along with a special signal through the conductor 36 from the address register 22 as later described.

The transfer and shift counter 95 transmits a signal through the conductor 105 to the word counter 106. A signal is transmitted to the output conductor 105 only after the transfer and shift counter 95 has counted a total of 14 clock pulses (the 14th pulse occurring during the transition from count 13 to count 0).

The first clock pulse passed through the AND gate 86 after the end of a blanking signal is transmitted to the AND gates 99 and 102. Since at this time the transfer and shift counter 95 registers 0, the AND gate 99 is blocked and the AND gate 102 is open to transmit the clock pulse through the conductor 33 to the shift register 31. This clock pulse therefore causes the 13-bit word in the buffer register 29 to be transferred to the shift register 31. This same clock pulse is delivered through the conductor 111, through the AND gate 110 and the OR gate 27 to cause a 12-bit word to which the memory 21 has been addressed to be transferred to the buffer register 29.

When the second clock pulse passed by the AND gate 86 is transmitted to the AND gates 99 and 102, the clock pulse is passed by the AND gate 99 but is blocked from passing through the AND gate 102 because the transfer and shift counter now registers a 1 (not 0). Therefore, no signal is passed by the AND gate 102 to the AND gate 110. Hence, the AND gate 110 cannot transmit a pulse to the output conductor 112 and no signal is transmitted through the OR gate 113 to the unload input conductor 27. Accordingly, the memory storage device is not signalled to unload a word into the buffer register 29. Likewise, no signal follows to the data word available output conductor 32, and the buffer register 29 is not signalled to transfer a word to the shift register 31. On the other hand, the inverter 97 now generates an output signal so this second clock pulse passes through the AND gate 99 to its output conductor 35 and on to the shift register 31. This causes the shift register 31 to shift out the first bit of the 13-bit word in digital fashion to its output conductor 34. Of course, since no signal has been supplied to the unload input conductor 27, no change occurs in the memory storage 21, and no signal is transmitted to the end of cycle indexing conductor 26. Hence, the address register counter 22 does not now change.

The same operation as just described for the second clock pulse takes place for each following clock pulse from the third through the 13th pulse. For each of these clock pulses, no signal is supplied to the unload input conductor 27 or to the transfer input conductor 33 and no signal is transmitted to the word counter 106. These successive third through 13th clock pulses are transmitted in order to the shift register 31 to cause the shift register to shift out the first 12 bits of the 13-bit word it has been holding.

Now, on the 14th pulse passed by the AND gate 86, everything just described occurs again, with the shift register 31 shifting out the 13th (last) bit of its word. Until this time, the conductor 105 has carried no signal but, on the 14th pulse, a pulse is transmitted through the conductor 105 as an indexing signal to the word counter 106, since a complete word has now been shifted out of the shift register 31. Hence, the word counter 106 registers a 1 for completion of the first word.

This 1 word count produces no change in the absence of a signal in the output conductor 107. However, subsequently upon counting five words, a 5 count output from the word counter 106 is transmitted through its output conductor 107 to the inverting device 108. As a result, the inverting device is flipped to interrupt the signal it has been transmitting. When the signal from the inverting device 108 is interrupted, the AND gate 110 is disabled and no signal passes through it for the duration lasting from the end of the fifth word count to the end of the sixth word count. Therefore, the memory storage device 21 unloads a total of six words in each 0–13 count/cycle of the counter 58, the first occurring on the introduction of the horizontal sync pulse to the OR gate 113 and the second through sixth occurring on the introduction of the 1 through 5 counts by the word counter 106.

Likewise, the 1 word count output signal does not change the absence of a signal in the output conductor 120 since the conductor 120 is connected to receive a signal only when the word counter 106 registers a count of 6. Because of the inverting device 121, the lack of a signal in the conductor 120 has caused a signal to be present in the conductor 89 leading to the AND gate 86. However, when the word counter 106 registers a count of 6, a signal is transmitted through the conductor 120 to the inverting device 121. With the presence of a signal in the conductor input 120, no signal is transmitted through the conductor 89, and the AND gate 86 is disabled for the duration lasting from the end of the sixth word count to the following horizontal sync pulse. Hence, no transfers of words from the memory storage device 21 or the buffer register 29 take place after the end of the sixth word until the next horizontal sync pulse occurs in the 0–113 count cycle of the counter 58.

When the address register counter 22 reaches a count that is any multiple of 256, it generates a 1 signal to its output conductor 36. This 1 signal tags the word that begins a series of 256 words that constitute a block. This tag signal is transferred through the conductor 37 from the buffer register 29 along with the 12-bit memory word to the shift register, and is serially shifted out of the shift register immediately preceding that 12-bit word.

The signals in the conductor 34 as shifted out of the shift register 31 constitute a stream of information that begins with a blank period lasting from the beginning to the end of the blanking signal followed by six groups of 14 signals. In each group of 14 signals, the first signal is a 1 or a 0 signifying the presence of absence of a tag signal. The next 12 signals correspond to the data bits originally derived from the memory device 21. The last signal is a 0 or gap signal signifying the end of the word. The end of the sixth word is followed by a 0 signal period that lasts until the beginning of the next blanking signal.

These signals are converted to analog signals in the digital to analog converter 128, and the analog signals flow on to the summing amplifier 130. The other input to the summing amplifier constitutes a conventional color television black burst signal generated by the black burst generator 43. In the summing amplifier 130, the black burst signal is added to the analog signals at each blank period already mentioned as lasting from the beginning to the end of the blanking signal.

From the summing amplifier 130, the video signal is modulated by the RF modulator 132, is amplified and linearly combined with similar signals from other transmitters in the summing circuits and amplifier 134, and is transmitted on to the cable network.

In the operation of the receiver 150, the channel selecting means 167 are set to enable the color television receiver front end 151 to receive information from a selected one of several transmission channels. The selection having been made, the color TV receiver front end 151 receives a continuous stream of transmitted information.

The processor 153 delivers an initial instruction signal through the array of conductors 164–166 to the address register counter 161 instructing the address register counter 161 to supply an initial address signal through the conductor bank 162 to the memory section 154. This initial address signal identifies a particular location in the memory section 154 for storage of the first word which the memory section will receive.

The processor 153 is also programmed to deliver a block selecting number through the 12 conductors 230 to the comparator 229, specifying to the comparator 229 which block is desired. This block specifying number will establish the identity of the 256 word block that the processor has been programmed to select from the continuous stream of information being received by the color TV receiver front end 151.

Finally, the processor 153 is programmed to transmit a start selection/transfer process signal through the conductor 242 to the start/stop synchronizer 216. This signal in the conductor 242 enables the start/stop synchronizer 216 to be flipped to its "set" or "on" condition when an appropriate signal is present in the conductor 215 leading to the start/stop synchronizer 216. The start selection/transfer process signal programmed by the processor 153 is also transmitted by the conductor 243 to the block transfer counter 244 to set the block transfer counter 244 to a count of 0.

Turning now to the stream of information coming from the color TV receiver front end 151, the video signal emerging from the analog to digital converter 175 constitutes the digital bit data that is transmitted serially through the conductor 176 to the assembly shift register 177. At the same time, the clock pulse signal is being delivered through the conductor 182 to the AND gate 183 and simultaneously through the conductor 184 to the AND gate 185. This clock pulse signal is at half the frequency of the local oscillator signal emerging from the color TV receiver front end 151 through the conductor 169. That local oscillator signal produced by the local oscillator in the television receiver front end is synchronized and phase-locked to the color subcarrier in the black burst signal received from the transmission line by the television receiver front end 151. Hence, the clock pulse signal is in phase with the basic timing of the transmitted signal from the central storage transmission system 20.

The clock pulse signal passes through the AND gate 185 except when the AND gate 185 is blocked during the period from the end of the sixth word count produced by the word counter 197 through the period of the blanking signal delivered to the AND gate 185 through the conductor 192. At all other times, the clock pulse signal passes through the delay device 206 and is delivered as indexing pulses to the shift and transfer counter 199.

It will be noted that, initially, the shift and transfer counter 199 has been set to a count of 0 by the horizontal sync pulse transmitted to it through the conductor 198. This same horizontal sync pulse also has initially set the word counter 197 to a count of 0 through transmission of the horizontal sync pulse through the conductor 196.

The primary function of the shift and transfer counter 199 is to establish the fact of a full word count. In other words, during counts of 0 through 12 by the shift and transfer counter 199, no signal is present in the output conductor 209 and therefore a signal is present in the output conductor 211 from the inverting device 210 to keep the AND gate 183 open. Accordingly, the first 13 clock pulses are passed through the AND gate 183 and through the conductor 212 to signal the assembly shift register to shift 13-data bits from the conductor 176 into the assembly shift register 177 where these 13 bits are held in a parallel array. These 13 bits constitute the tag bit plus the 12 bits of the word. The tag bit will be a 1 for the first word of a 256 word block and a 0 for all subsequent words in the block.

The 13-shift pulses which are transmitted to the assembly shift register 177 through the conductor 212 are derived from clock pulses supplied to the AND gate 183 from the conductor 182. However, it is the gating of the AND gate 183 by signals in the conductor 211 that determines the transmission of the 13 shift pulses. The shift and transfer counter 199 causes gating of the AND gate 183. This is because the conductor 209 leading from the shift and transfer counter 199 carries a signal only when the shift and transfer counter 199 registers 13. Hence, no signal is present in the conductor 209 when the shift and transfer counter 199 registers a 0 through 12. When there is no signal in the conductor 209, the inverting device 210 does produce a signal in its output conductor 211 to hold the gate 183 open and admit 13-shift pulses to the assembly shift register 177. In this manner, 13 bits of data being supplied from the conductor 176 are serially shifted into the assembly shift register 177, the first bit constituting the tag bit. When the shift and transfer counter 199 registers 13, a signal is produced in the output conductor 209 and, therefore, no signal in the conductor 211, closing the AND gate 183. At this time the full 12 bits of a word plus the 13th tag number bit have been shifted into and are assembled in the assembly shift register 177.

When the 14th clock pulse occurs, the shift and transfer counter counts from 13 to 0. During this 14th pulse, a signal is produced in the conductor 214 to index the word counter 197, because this signal occurs after a complete word has been counted. Since the word counter 197 was initially set to 0 by the horizontal sync pulse in its input conductor 196, this first signal in the conductor 214 indexes the word counter 197 to a count of 1. The 14th pulse also causes a signal to be transmitted through the conductor 215 to the start/stop synchronizer 216. This flips the start/stop synchronizer to its "set" or "on" condition and it transmits a signal to the AND gate 220 through the conductor 221.

The 14th pulse is also delivered through the conductor 217 and through the delay device 218 to the AND gate 220. Since there are signals in both the conductors 219 and 221, the AND gate 220 transmits a signal through the conductors 223 and 225 to both the AND gates 224 and 226.

It will be recalled that, at this time, the block transfer counter 244 has been set to 0 by the signal in the conductor 243. Therefore, an output signal appears in the conductor 248, but because of the inverting device 249, no signal appears in the conductor 250. Hence, the gate 226 is closed and cannot pass the signal from the conductor 225. Whether or not the gate 224 is open depends upon the condition of signals supplied to the comparator 229. The comparator 229 delivers a signal to its output conductor 228 only when there is a match of the 13 signals constituting the 12-bit block specifying number supplied through the conductors 230 and the fixed 1 tag bit number in the conductor 232 with the 13 signals transmitted through the conductors 234 and 235 from the assembly shift register. If there is a match, the word assembled in the assembly shift register must contain a 1 in the tag bit position, indicating that the word is the initail word of a block. Furthermore, the signals in the 12 conductors 234 and the 12 conductors 230 to the comparator must also match, indicating that the block identifying number is the specific one sought by the process or 153. When there is such a match, a signal is transmitted from the comparator 229 through the conductor 228 to open the gate 224 because it is now desired to accept this word and the 255 words which follow it into the memory section 154.

Upon opening the gate 224, the signal from the conductor 223 is transmitted through the conductor 252 to the OR gate 253. This pulse is delivered from the OR gate 253 to the transfer input conductor 255 leading to the buffer register. Upon receipt of this pulse, the buffer register causes the 12-bit signals of the word then present in the assembly shift register 177 to be transferred in parallel to the buffer register 238.

The output signal from the OR gate 253 is also delivered by the conductor 256 to the memory section 154. After the internal delay in the memory section 154, the 12-bit word then stored in the buffer register 238 is transferred in parallel to the specific location within the memory section 154 dictated by the address register counter output conductor 162. After the 12-bit word has been stored in the memory section 154, an end-of-cycle pulse is transmitted through the conductor 163 from the memory section to the address register counter 161 to index the address register counter 161 to its next word address. The address register counter 161 then sends this new address signal through the conductor bank 162 to direct the memory section 154 regarding the positioning of the next word it will receive from the buffer register 238.

The signal from the OR gate 253 is also delivered through the conductor 257 and the delay device 258 back to the block transfer counter 244 to index the block transfer counter to its next or 1 count. With the presence of a 1 count in the block transfer counter 244, no signal is transmitted to the output conductor 248 and therefore a signal is supplied from the inverting device 248 through the conductor 250 to open the AND gate 226. Similarly, on succeeding counts of the block transfer counter from 2 through 255, the AND gate 226 will be opened. Therefore, although the AND gate 224 is opened only for the initial appropriate block identifying number, the AND gate 226 passes pulses for the succeeding 255 words to the OR gate 253. On the 256th count by the block transfer counter 244, the block transfer counter 244 will transmit a signal through the conductor 245 to stop the start/stop synchronizer 216 and through the conductor 246 to advise the processor 153 that it has then received the entire 256 words of the block it had been programmed to receive.

In this process, each time the shift and transfer counter 199 has completed the count of 13 and has assembled a word in the assembly shift register 177, it goes back to a count of 0. The word assembled in the assembly shift register will then be transferred to the buffer register and subsequently to the memory section 154 as already described. The 0 count in the shift and transfer counter 199 will again open the AND gate 183 to cause 13 additional clock pulses to be transmitted to the assembly shift register, causing the parallel assembly of 13 additional digits of data in the assembly register 177. For every group of 13 pulses, another indexing signal is transmitted to the word counter 197. On each count of six words, the word counter 197 delivers a signal to the conductor 200 through the inverting device 201, resulting in no signal being present in the conductor 202. This blocks the AND gate 185. Subsequently, a blanking signal from the signal standardizer 188 passes through the inverting device 190 resulting in no signal present in the conductor 192. This lack of a signal in the conductor 192, due to the transmission of a blanking signal, holds the gate 185 open until the end of that blanking signal or until the next information carrying video signal.

Thus, this information transmission and multiple receiver system continuously transmits or broadcasts, computer programs from a large central memory (or several large central memory sources) to a large number of receivers that have data processors. The data processors, which may be of low compute power and therefore relatively inexpensive, are empowered with the logic of the computer programs being continuously broadcast. Each receiver can select programs from the continuous broadcast stream for application and its data processor. As a result, the compute power of each receiver is greatly compounded.

We claim:

1. A transmission and receiver system comprising at least one transmitter and a plurality of receivers, the transmitter including a memory storage device for storing groups of data signals comprising computer programs, means to address the memory storage device to identify portions of the stored data signals that are to be read out of the memory storage device according to a predetermined schedule, means to read out groups of the data signals thus identified continuously from the memory storage device, means to transmit the groups of data signals read out from the memory storage device to a transmitting station for transmission thereby as a continuous broadcast, each receiver comprising means to receive the continuous broadcast including the data signals transmitted thereby, means to generate synchronizing signals in the transmitter, means to synchronize the data signals transmitted by the transmitter with the synchronizing signals, means to generate synchronizing signals in the receiver synchronized to the transmitter synchronizing signals, and means to synchronize the data signals received by the receiver with the synchronizing signals generated by the receiver, a processor having a memory section, each receiver having means to identify selected ones of the plurality of data groups for transfer to its memory section, and means to transfer the thus identified plurality of data groups to the memory section of the processor thereby making the data signals comprising computer programs available for use by each processor to increase the information processing capability of each processor.

2. The system of claim 1 wherein the transmitter has means controlled by the address means for generating coding signals to identify specific pluralities of the said groups of data signals, means to add the identifying signals at predetermined times to the groups of data signals prior to transmission thereof to enable identification of selected ones of the plurality of groups of data signals, the receiver having a comparator, means to provide the comparator with other signals identifying a specific plurality of groups of data signals that is to be selected for storage in the memory section, the comparator having means to compare the identifying signals with the data signals received by the receiver, and means controlled by the comparator and responsive to a match of signals sensed by the comparator for enabling the receiver to transfer groups of data signals to its memory section.

3. The system of claim 1 wherein the synchronizing signals generated by the transmitter comprise color television black burst signals and the receiver includes a television receiver front end unit for receiving the transmitted signals and for generating the synchronizing signals.

4. The system of claim 3 wherein the transmitter includes means to generate a standard color television carrier signal, means including a color television modulator for modulating the carrier signal with the groups of data signals and the black burst signals, and the receiver includes a color television signal demodulator for demodulating the modulated carrier signal to produce the groups of data signals and the black burst signal.

5. A method for using a system of one or more transmitters and a plurality of receivers for the continuous broadcast of computer programs to the receivers for selective utilization at the receivers to process information comprising the steps of storing the computer programs in the form of information bits in a central memory at the transmitter reading out the information bits from the central memory in a predetermined order, continuously transmitting the information bits in a broadcast stream, at each receiver identifying a selected portion of the broadcast stream, and writing the selected portion of the broadcast stream into a local memory storage unit at the said receiver and using the information thus stored for the purpose of programmed operation of an information processing part of each receiver.

6. The method of claim 5 including the steps of coding portions of the serial broadcast stream to identify the content thereof, the said steps of identifying a selected portion of the serial broadcast stream including the step of comparing the received signals with predetermined signals.

7. The method of claim 6 including synchronizing the information bits with a standard color television black burst signal.

8. The method of claim 6 including the steps of collecting predetermined numbers of the information bits as words, and grouping predetermined numbers of the words in groups, each said code identifying a word group.

9. The method of claim 5 including the steps of converting the information bits to analog signals prior to transmission thereof, and converting the analog signals to digital signals following receipt thereof by the receivers.

10. A method a communicating logical information comprising computer programs from a central storage source to a plurality of receivers for processing information at the receivers utilizing selected portions of the logical information to increase the information processing information at the receivers comprising the steps of continuously repeating the cycle of extracting information bits comprising computer programs in a predetermined sequence from a memory storage device containing the computer programs, coding as words predetermined groups of the computer program information bits, generating synchronizer signals, synchronizing the computer program information bits with the synchronizer signals, transmitting in a continuous broadcast the synchronized computer program information bits as a continuously repeating cycle of signals to a plurality of independent receivers, selecting independently at each receiver portions of the transmitted computer program information bits, and at each receiver writing the portions of computer program information bits selected by that receiver into a memory unit for use of the selected computer programs to process information at the receiver.

11. The method of claim 10 including the step of coding predetermined portions of the computer program data bits according to subject matter prior to transmission thereof, and selecting the said portion after receipt thereof by a receiver by designating the particular coding therefor.

12. A method of using broadcast apparatus to increase the information processing capability of a plurality of individual receivers comprising the steps of continuously broadcasting a repeating cycle of computer programs derived from a relatively large information storage device, at each receiver selectively identifying portions of the broadcast programs according to which programs are to be used at each receiver, directing the selected portions of computer programs thus identified to a memory section of each receiver, and independently utilizing the computer programs stored in the memory section of each receiver to process information by a processor at that receiver.

13. The method of claim 12 including the steps of addressing the memory storage device of shift information bits comprising words of computer programs in parallel from the memory storage device, converting the words to a serial stream of the information bits, converting the serial stream of information bits to an analog signal, broadcasting the analog signal for receipt by all the receivers, at each receiver reconverting the analog signal to a serial stream of information bits, at each receiver identifying from the serial stream of information bits selected groups of the information bits that are to be retained at that receiver by being directed to the memory section thereof.